Dec. 27, 1966  C. C. HACH  3,294,490
AUTOMATIC CONTINUOUS ANALYZER
Filed March 25, 1963  2 Sheets-Sheet 1

INVENTOR.
Clifford C. Hach,
BY
Wolfe, Hubbard, Voit & Osann
Attorneys.

United States Patent Office 3,294,490
Patented Dec. 27, 1966

3,294,490
AUTOMATIC CONTINUOUS ANALYZER
Clifford C. Hach, Ames, Iowa, assignor to Hach Chemical Company, Ames, Iowa, a corporation of Iowa
Filed Mar. 25, 1963, Ser. No. 267,467
7 Claims. (Cl. 23—253)

This invention relates to equipment for making chemical analyses, and more particularly concerns automatic continuous analyzers.

Apparatus for automatically making chemical analysis has long been proposed on a theoretical basis, and devices of various kinds have actually been commercially developed prior to the present time. However, if such devices and apparatus have any common characteristics, they are complexity and high cost. Even with the modern emphasis on "automation," many routine and frequently made chemical tests are still performed "by hand" because of the simple economic considerations involved.

Accordingly, it is the primary aim of this invention to provide a simple and economical apparatus for automatically making continuous chemical analyses of the type requiring mixing of one or more reagents with a fluid sample in controlled proportions. An important related object of this invention is to provide an apparatus of this character which is accurate and reliable.

A further object is to provide an analyzer as referred to above which is temperature compensated; that is, one in which the desired sample-reagent mixing proportion does not appreciably vary with changes in temperature.

Another object is to provide an analyzer of the above type which can be easily serviced and cleaned.

It is also an object to provide an analyzer as characterized above which can be readily adapted for performing any one of a variety of tests.

Other objects and advantages of the invention will become apparent upon reading the following detailed description, and upon reference to the drawings, in which.

While the invention will be described in connection with preferred embodiments, it will be understood that I do not intend to limit the invention to those embodiments. On the contrary, I intend to cover all alternatives, modifications, and equivalents as may be included within the spirit and scope of the invention as defined by the appended claims.

Figure 1:
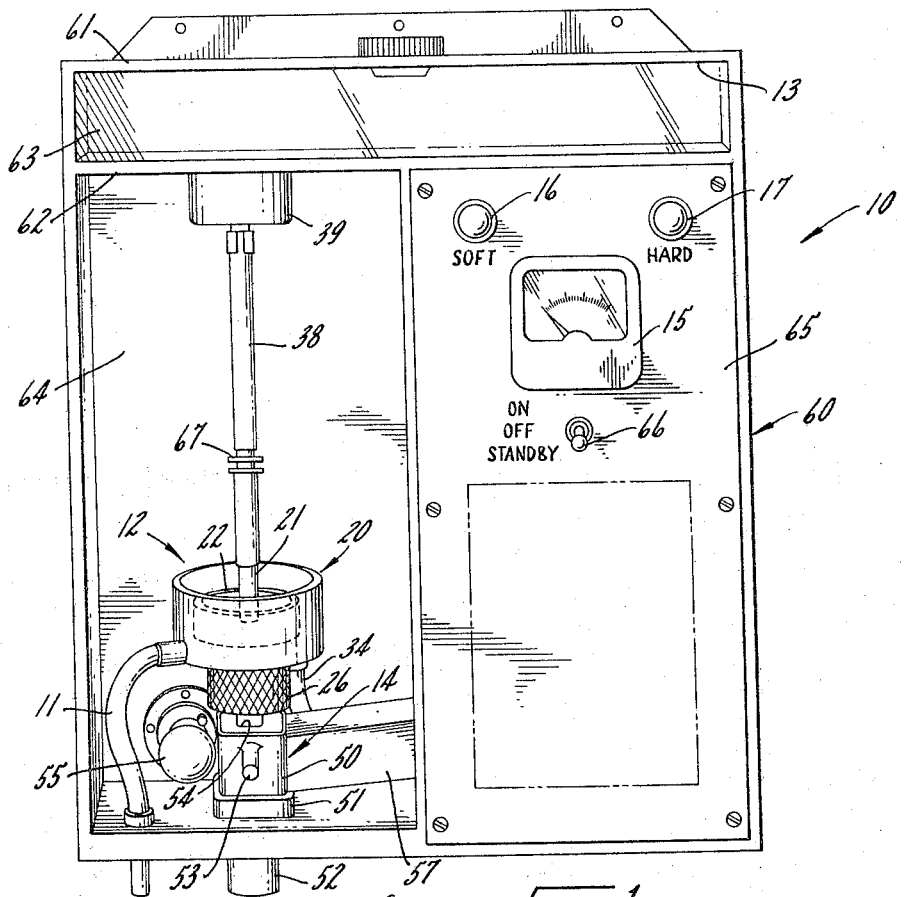
FIGURE 1 is a front perspective of an analyzer constructed in accordance with the present invention.
Figure 2:
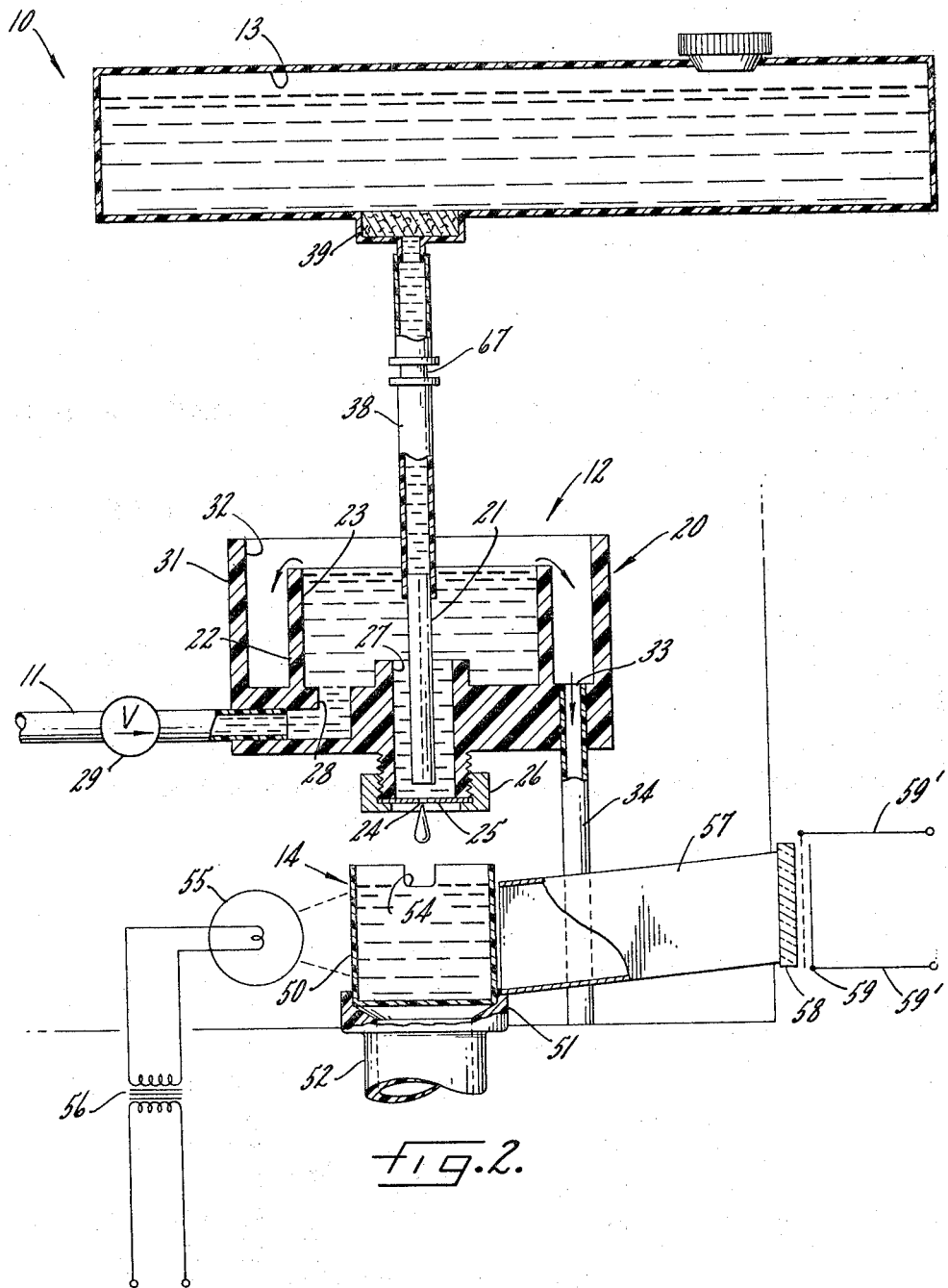
FIG. 2 is a somewhat enlarged, partially diagrammatic elevation of the analyzer shown in FIG. 1.

Turning to FIGS. 1 and 2, there is shown an analyzer 10 embodying the invention and arranged to monitor the hardness of water. As so arranged, the analyzer receives a steady flow of the fluid sample, in this case water, through a line 11, and an apparatus 12 mixes the water in controlled proportion with a buffer-indicator reagent from a container 13. The mixed sample-reagent flows into a cell 14 of a colorimeter arranged to detect color changes. In the example being discussed, the fluid reagent contains a desired concentration of EDTA hardness sequestering agent so that, at a particular water hardness point, the fluid in the cell 14 changes from blue to red. This triggers the colorimeter apparatus which sends a signal to a meter 15 and trips a relay turning a light 16 off and a light 17 on.

The test method, in a chemical sense, is not a part of the present invention, nor are the details of the circuit portions of the colorimeter apparatus which includes the cell 14, the meter 15, and the lights 16, 17. These are matters familiar to those skilled in the art and are recited here simply by way of example.

Pursuant to the invention, the mixing apparatus 12 includes a mixing body 20 for delivering the fluid sample at a controlled rate and for receiving a reagent delivering capillary tube 21, the tube and the body being arranged to mix reagent and sample in predetermined proportions that do not vary upon temperature changes. In the illustrated construction, the body 20 is formed with an annular wall 22 defining a sample reservoir 23 having, at its bottom, an aperture 24. The aperture 24, in the FIGS. 1 and 2 modification, consists of a hole formed in an aperture disk 25 that is secured in place by a nut member 26. The bottom of the reservoir 23 is formed to define a well 27 which surrounds and overlies the aperture 24 and which receives the capillary tube 21.

The line 11 connects to a reservoir inlet opening 28, and a valve 29 is provided in the line 11 exteriorally of the apparatus 10 for controlling the rate at which the fluid sample is introduced to the apparatus. The fluid sample is added at a rate greater than the flow rate possible through the aperture 24, and the body 20 includes an outer wall 31 that defines an annular trough 32 which collects and discharges the excess fluid sample spilling over the wall 22, indicated by the arrows in FIG. 2. This excess is discharged through an opening 33 and a line 34 leading out of the analyzer 10. As a result of this constant overflow arrangement, a uniform head of fluid sample is maintained relative to the aperture 24, and hence a constant flow rate is maintained through the aperture.

The capillary tube 21 is suspended in the well 27 by a flexible hose 38 that provides a fluid connection from the tube to the container 13 through a strainer 39. The lower end of the tube 21 closely overlies the aperture 24. The reagent is slightly more dense than the fluid sample in the reservoir 23. Hence, the reagent, being discharged at a controlled rate through the capillary tube 21, diffuses as it leaves the tube so as to blend with the fluid sample and is carried with the sample downwardly through the aperture 24 into the cell 14. Positioning of the tube 21 within the well 27 assures a downward current flow about the lower end of the tube and, hence, insures that all of the reagent released from the tube does move directly downwardly and through the aperture 24.

Figure 3:
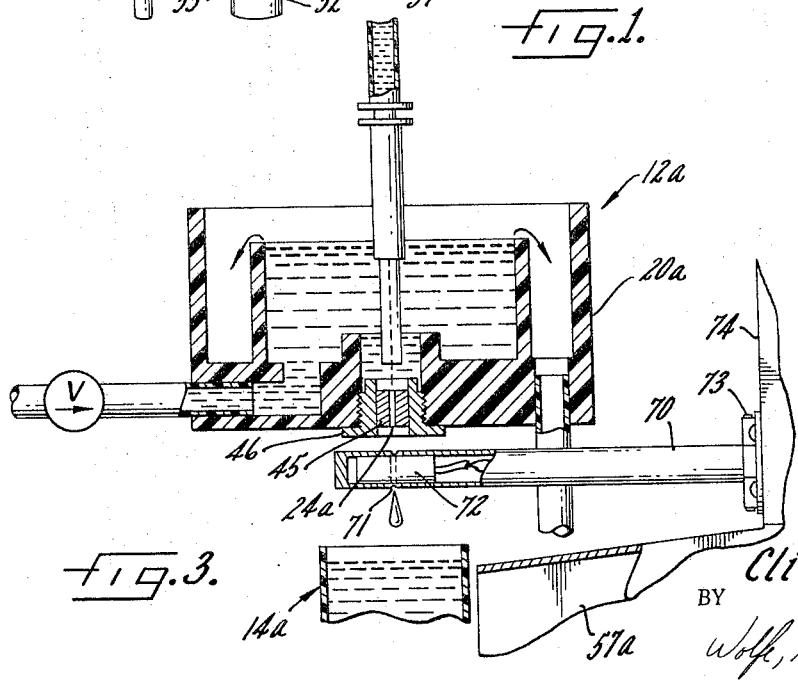
FIG. 3 is a fragmentary representation similar to FIG. 2 showing a modified form of the apparatus.

It can thus be seen that the reagent and sample delivered to the cell 14 are mixed in controlled proportions. The constant head relative to the aperture 24 insures a uniform flow of the reagent-sample mixture. The capillary tube 21 closely regulates the rate at which reagent is added to the sample. With the aperture disk 25 shown in FIG. 2, a rather low ratio of reagent to sample is maintained. If a higher ratio is desired, the mixing body aperture may be defined by a semi-capillary tube 45 embodied in the modification shown in FIG. 3. In this modification, parts similar to those previously described have been given the same reference numeral with the distinguishing suffix "a" added, and hence there is there shown a mixing apparatus 12a which includes a body 20a having a lower aperture 24a defined by the semi-capillary tube 45. The tube is mounted in a plug 46 for easy replacement or servicing. Since the flow rate through a tube such as the tube 45 is slower than through an aperture plate such as the plate 25, a higher ratio of reagent to sample is obtainable with the apparatus 12a than with the apparatus 12. In other respects, the structures are similar.

The mixing apparatus 12 is temperature-compensating since the capillary tube 21 is immersed in the fluid within the sample reservoir 23. The tube is thus in good heat-exchange relationship with the fluid sample. Therefore, although the temperature, and hence viscosity, of the fluid sample introduced to the analyzer through the line 11 might change, the temperature changes in the fluid sample are immediately imparted to the reagent moving downwardly through the tube 21, so that the reagent assumes the same temperature as the fluid sample. There is thus a corresponding change in the viscosity of both the sample and the reagent, and, hence, the relative proportions of these two fluids as they are mixed and discharged to the colorimeter cell 14 remain substantially the same.

The colorimeter cell 14 into which the reagent-sample falls is preferably a transparent cup 50 removably seated in a funnel-like top 51 of a discharge fitting 52. The cup 50 carries a handle 53 and is formed with a spout notch 54 from which the fluid-sample mixture spills over into the rear portion of the fitting top 51 and thence downwardly and out of the analyzer 10. The colorimeter apparatus includes a lamp 55 energized through a transformer 56 and positioned to direct a light beam through the cell cup 50 and into a tunnel 57. A red filter 58 is positioned at the end of the tunnel in front of a photocell 59 which is connected through leads 59' to the colorimeter circuitry referred to generally above.

As a further feature of the invention, the analyzer 10 includes a box-like frame 60 having a double walled upper portion, including walls 61 and 62, spanned by a transparent front plate 63 so as to define the reagent container 13. The lower portion of the frame 60 is divided into an open front region 64 which contains the mixing apparatus 12, and an enclosed portion 65 containing the colorimeter indicating apparatus including the lights 16, 17, the meter 15, and an on-off switch 66.

It can thus be seen that the frame 60 forms a neat, compact enclosure for the analyzer 10. The fluid container 13 extends the full width and depth of the analyzer frame and is relatively flat so that the fluid head, relative to the tube 21, is not substantially disturbed as the reagent is exhausted from the container. The transparent plate 63 permits the supply of reagent to be checked at a glance. The enclosed portion 65 safely shields and protects those parts of the analyzer requiring little or no servicing or adjustment. The mixing apparatus 12 is within easy reach for servicing and inspection within the open front region 64 of the frame 60. The colorimeter cell cup 50 can be easily lifted out by grasping its handle 53, and releasing the nut member 26 permits inspection or replacement of the aperture plate 25. Preferably, the flexible hose 38 is in two parts and includes an intermediate connecting element 67 so that the capillary tube 21 in the lower portion of the hose 38 can be easily and quickly separated from the apparatus. The flexibility of the hose 38 adds to the convenience with which the apparatus 12 may be handled.

For some tests, heat is required for the reagent-sample mixture. To perform this function the apparatus 12a illustrated in FIG. 3 includes a heater in the form of a rod 70 having a generally vertically disposed, peripheral groove 71 that underlies the aperture 24a. A heating element 72 is embedded within the rod 70. Fluid dropping downwardly from the aperture 24a is thus received within the groove 71 and is heated by the element 72 as the fluid rolls around the rod and falls downwardly into the colorimeter cell 14a. Preferably, the rod 70 is hinged at 73 to a portion 74 of the analyzer frame so that the rod can be quickly and easily swung from beneath the aperture 24a when heating of the reagent-sample mixture is not desired.

Those familiar with this art will at once appreciate that analyzers constructed according to the present invention are extremely simple and can be quite economically manufactured and operated. Nevertheless, the units are quite reliable and accurate. The temperature compensating feature greatly facilitates use of the analyzers in environments where sample fluids may be drawn in from unheated areas, as in water treatment plants. The quick and ready adaptability of the analyzer to handle various testing assignments is facilitated by the ease with which it may be serviced and inspected, and by the fact that the plate defining the aperture 24 and the capillary tube 21 can be readily changed to produce a desired proportioning between the reagent and the sample.

I claim as my invention:

1. In an analyzer, apparatus for mixing a fluid reagent with a less dense fluid sample in controlled proportions comprising, in combination, a mixing body having a bottom aperture enclosed by a wall defining a sample reservoir of fixed head relative to the aperture, means for supplying a fluid sample to said reservoir at a rate greater than the flow rate through said aperture, said body including a trough to collect and discharge the fluid sample which spills over said wall, a reagent container positioned above said mixing body, and a capillary tube having a fluid connection with said container and extending down into the fluid sample in said reservoir so that the lower end of the tube overlies said aperture.

2. In an analyzer, apparatus for mixing a fluid reagent with a less dense fluid sample in controlled proportions comprising, in combination, a mixing body having a bottom aperture enclosed by a wall defining a sample reservoir of fixed head relative to the aperture, means for supplying a fluid sample to said reservoir at a rate greater than the flow rate through said aperture, said body including a trough to collect and discharge the fluid sample which spills over said wall, a reagent container positioned above said mixing body, and a capillary tube suspended by a flexible hose connection with said container and extending down into the fluid sample in said reservoir so that the lower end of the tube overlies said aperture, said body defining a well surrounding and overlying said aperture so as to restrict fluid flow about said tube to uniform fluid movement down through the aperture.

3. In an analyzer, apparatus for mixing a fluid reagent with a less dense fluid sample in controlled proportions comprising, in combination, a mixing body having a bottom aperture enclosed by a wall defining a sample reservoir of fixed head relative to the aperture, means for supplying a fluid sample to said reservoir at a rate greater than the flow rate through said aperture, said body including a trough to collect and discharge the fluid sample which spills over said wall, a reagent container positioned above said mixing body, a capillary tube having a fluid connection with said container and extending down into the fluid sample in said reservoir so that the lower end of the tube overlies said aperture, a rod underlying said aperture and formed with a generally vertically disposed, peripheral groove for receiving fluid dripping from said aperture, and a heating element in said rod.

4. In an analyzer, apparatus for mixing and heating a fluid reagent with a fluid sample in controlled proportions comprising, in combination, a mixing body having a bottom aperture and defining a sample reservoir of fixed head relative to the aperture, means for supplying a fluid sample to said reservoir, a reagent container positioned above said mixing body, and a tube having a fluid connection with said container and extending down into the fluid sample in said reservoir so that the lower end of the tube overlies said aperture, a rod underlying said aperture and formed with a generally vertically disposed peripheral groove for receiving fluid dripping from said aperture, and a heating element in said rod.

5. An analyzer comprising, in combination, a generally rectangular box-like frame, said frame having a double walled upper portion, a transparent front plate for said upper portion, said double walled portion and front plate defining a reagent container at the top of said frame having a short vertical dimension, said frame having its lower portion beneath said container divided into an open front region and an enclosed portion, mixing apparatus in said region for bringing together a flow of sample fluid and a flow of reagent from said container, and indicating apparatus in said enclosed portion for displaying the reaction between said sample and said reagent.

6. An analyzer comprising, in combination, a generally rectangular box-like frame, said frame having a double walled upper portion, a transparent front plate for said upper portion, said double walled portion and front plate defining a reagent container at the top of said frame having a short vertical dimension, said frame having its lower portion beneath said container divided into an open front region and an enclosed portion, mixing apparatus in said region for bringing together a flow of sample fluid and a flow of reagent from said container, indicating apparatus in said enclosed portion for displaying the reaction between said sample and said reagent, and a rod heater hinged on said frame so as to be swingable into said flow of sample fluid and reagent and thereby permit selective heating of the fluid.

7. An analyzer comprising, in combination, a generally rectangular box-like frame, said frame having a double walled upper portion defining a reagent container at the top of said frame, said frame having its lower portion beneath said container divided into an open front region and an enclosed portion, a mixing body in said region having a bottom aperture enclosed by a wall defining a sample reservoir of fixed head relative to the aperture, means for supplying a fluid sample to said reservoir at a rate greater than the flow rate through said aperture, said body including a trough to collect and discharge the fluid sample which spills over said wall, a capillary tube having a fluid connection with said container and extending down into the fluid sample in said reservoir so that the lower end of the tube overlies said aperture, and indicating apparatus in said enclosed portion for displaying the reaction between said sample and said reagent.

References Cited by the Examiner

UNITED STATES PATENTS

| | | | |
|---|---|---|---|
| 659,494 | 10/1900 | Smith | 210—220 |
| 673,465 | 5/1901 | Annin | 312—228 |
| 679,612 | 7/1901 | Evans | 137—571 |
| 1,602,705 | 10/1926 | Riley et al. | 210—256 |
| 2,297,311 | 9/1942 | Mead et al. | 210—83 |
| 2,980,512 | 4/1961 | Petersen | 23—253 |
| 3,026,182 | 3/1962 | Jankowski et al. | 23—253 |
| 3,186,799 | 6/1965 | Hach | 23—253 |

OTHER REFERENCES

Factory Mutual Engineering Division, Associated Factory Mutual Fire Insurance Companies, Liquified Petroleum Gas, Industrial Installations, Loss Prevention Bulletin No. 11.45, page 9, Fig. 8, Sept., 1957.

MORRIS O. WOLK, *Primary Examiner.*

HERBERT A. BIRENBAUM, *Assistant Examiner.*